United States Patent [19]

Vranas

[11] 4,317,102
[45] Feb. 23, 1982

[54] HOT FOIL TRANSDUCER SKIN FRICTION SENSOR

[75] Inventor: Thomas Vranas, Hampton, Va.

[73] Assignee: The United States of America as represented by the Administrator of the National Aeronautics and Space Administration, Washington, D.C.

[21] Appl. No.: 178,195

[22] Filed: Aug. 14, 1980

[51] Int. Cl.³ .................................... H01C 7/02
[52] U.S. Cl. .................................. 338/25; 29/613; 338/275; 338/28
[58] Field of Search ............ 338/25, 28, 22 R, 22 SD, 338/23, 24, 27, 252, 13, 311, 275; 73/204, 295, 339 R, 342, 189; 29/612, 613; 340/622

[56] References Cited

U.S. PATENT DOCUMENTS

| | | | |
|---|---|---|---|
| 2,928,037 | 3/1960 | Lawrence | 73/204 |
| 3,352,154 | 11/1967 | Djorup | 338/28 X |
| 3,438,027 | 4/1969 | Silvius | 338/219 X |
| 3,490,283 | 1/1970 | Vidal et al. | 73/204 |
| 3,677,085 | 7/1972 | Hayakawa | 73/204 |

FOREIGN PATENT DOCUMENTS 2209583 9/1972 Fed. Rep. of Germany .... 338/22 R

*Primary Examiner*—C. L. Albritton
*Attorney, Agent, or Firm*—Wallace J. Nelson; John R. Manning; Howard J. Osborn

[57] ABSTRACT

An improved hot wire transducer skin friction sensor 10 and 19. The device utilizes foil transducers 11 and 18 with only one edge exposed to the fluid flow. The surface 28 and 31 are polished producing a foil transducer 11 and 18 that does not generate turbulence while sufficiently thick to carry the required electrical current for high temperature fluid flow. The assembly utilized a precut layered metal sandwich 20 with attached electrodes eliminating a need for welding and individual sensor calibration.

10 Claims, 7 Drawing Figures

U.S. Patent  Feb. 23, 1982  Sheet 1 of 3  4,317,102
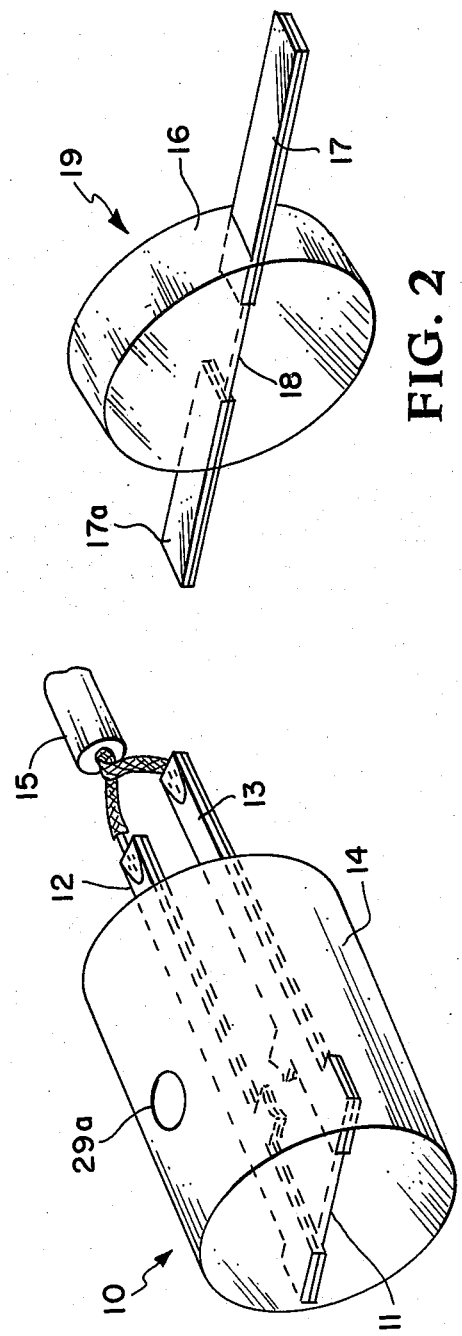
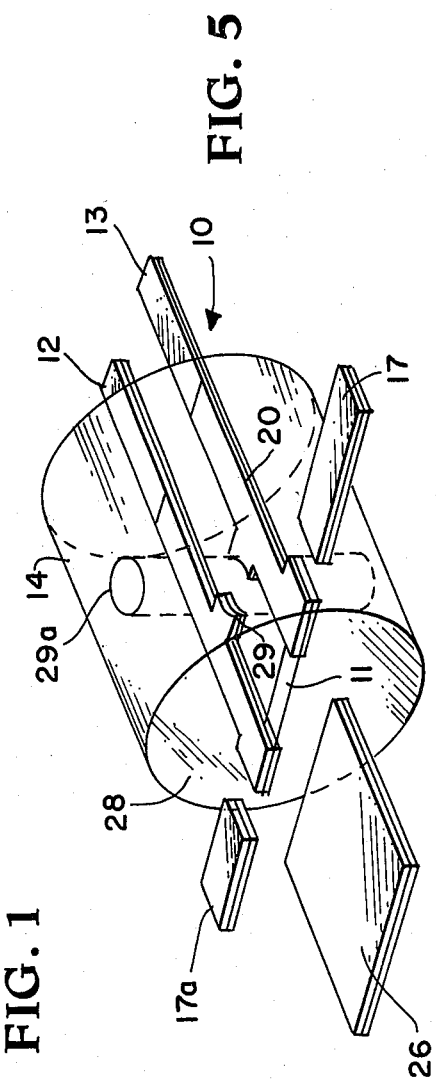

HOT FOIL TRANSDUCER SKIN FRICTION SENSOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

In wind tunnel testing of aerodynamic models and the like various devices are presently used to measure the friction caused by fluid flow over a surface. One such device commonly used is the hot wire transducer wherein a small diameter wire is placed on the tested surface and exposed to the fluid flow. In this device the wire is welded at each end to electrodes connected to an electrical circuit capable of measuring the change in resistance in the exposed wire. This change in resistance is measured as a function of temperature and skin friction. Problems associated with a skin friction sensor of this type include the generation of unwanted turbulence, difficulty in calibration and failure of the wire or weld connection in hot fluid flow.

Attempts have been made to reduce turbulence by partially setting the wire into the surface or using a foil, placed flatly on the surface as the transducer. Setting the small diameter wire into the surface is difficult and does not eliminate all turbulence. A foil sufficiently thick to carry the current required for all operating temperatures also does not eliminate turbulence.

The welding of the wire to the electrodes changes the resistance of the wire and produces a requirement for individual calibration. The wire failure problem has been overcome in one prior art device (U.S. Pat. No. 4,024,761 to Djorup) by providing support elements which add to the turbulence. Weld failure can be overcome by annealing to increase strength but this changes resistivity and produces a requirement for individual calibration. There is thus, a definite need in the art for a skin friction sensor that is turbulence free, capable of operating in a wide range of temperatures and that does not require individual calibration.

It is therefore an object of this invention to provide a skin friction sensor that does not generate turbulence in the fluid flow over a surface.

Another object of this invention is to provide an improved skin friction sensor that is resistent to high temperatures and will not fail in hot fluid flow.

A further object of this invention is to provide a skin friction sensor that does not require individual calibration.

An additional object is to provide an electrical transducer skin friction sensor capable of carrying sufficient current for all operating temperatures.

A still further object of the present invention is an improved method of making a turbulence resistant skin friction sensor.

These and other objects of the present invention together with the advantages attendant therewith will be more readily apparent when the specification is taken in conjunction with the attached drawings to which it relates.

SUMMARY OF THE INVENTION

This invention is an improved hot wire transducer skin friction sensor. By constructing the sensor with a foil transducer disposed perpendicular to the fluid flow and polishing the exposed surface, which consists of the edge of the foil and a plastic support structure, a smooth instrument surface that generates no turbulence can be achieved. The foil employed in the present invention is sufficiently thick to carry any desired current and there is no exposed wire or weld that can fail in high temperatures. The foil and plastic support surface is machined and polished to provide a desired foil thickness and resistivity. The positioning of the foil perpendicular to the fluid flow and the method for constructing the sensor including proper foil alignment ensure that the present invention provides a turbulence-free skin friction measuring device.

BRIEF DESCRIPTION OF THE DRAWINGS

A more complete appreciation of the invention and many of the attendant advantages thereof will be readily apparent as the same becomes better understood by reference to the following description when considered in connection with the accompanying drawings wherein:

FIG. 1 illustrates the preferred embodiment of a novel hot wire transducer skin friction sensor according to the present invention;

FIG. 2 is an illustration of an alternate embodiment of the present invention;

FIG. 5 is an illustration of the assembly process for molding the embodiment shown in FIG. 1;

DETAILED DESCRIPTION OF THE INVENTION

Figure 3:
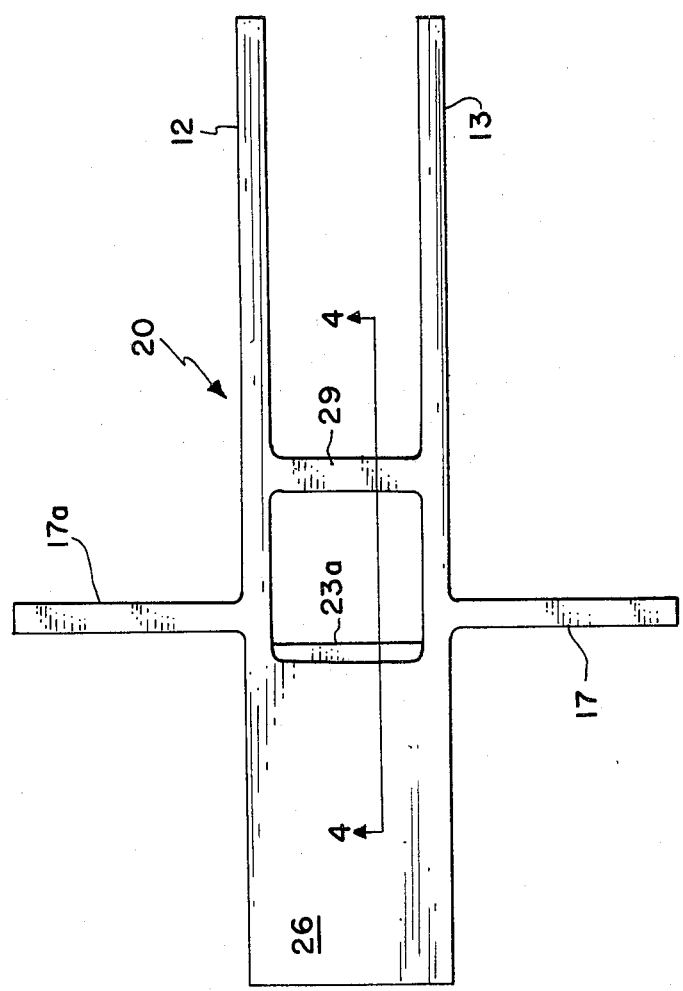
FIG. 3 is an illustration of a precut metal sandwich used in the assembly of a novel transducer skin friction sensor according to the present invention.

Referring to FIG. 1, there is illustrated the preferred embodiment of a hot foil transducer skin friction sensor according to the present invention and designated generally by the reference numeral 10. The sensor 10 consists of a transducer foil 11, with one edge exposed, two electrodes 12, 13 and a plastic support body 14. The electrodes 12, 13 are connected to an electrical lead 15 which runs to an electrical circuit, not illustrated, capable of detecting a change in resistivity of the transducer foil 11. FIG. 2 illustrates an alternate embodiment of the sensor as designated by reference numeral 19. The plastic support body 16 is thinner than that of the embodiment shown in FIG. 1 and the electrodes 17, 17a extend from the side of the plastic support body 16 rather than the rear.

Figure 4:
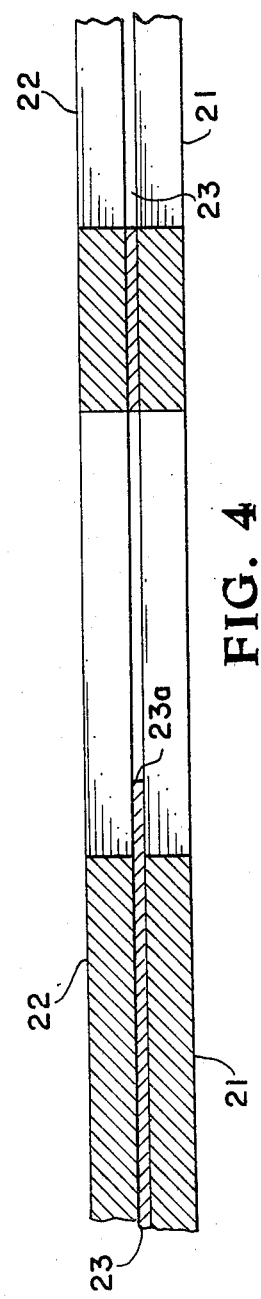
FIG. 4 is a cross-section view taken along line 4—4 of FIG. 3.

Referring now to FIG. 3, there is illustrated a metal sandwich 20 precut for assembly of the sensors 10 and 19. FIG. 4 is a cross-section taken along line 4—4 of FIG. 3 illustrating a thin foil 23 mechanically and electrically bonded in a conventional manner between the metal layers 21 and 22. Beryllium-copper sheets or other suitable conductive metal, is employed for metal layers 21 and 22 in constructing sandwich 20. One area 23a of the thin foil 23 is left exposed and upon assembly will serve as the transducer foil 11 and 18.

FIG. 5 illustrates the assembly of the embodiment illustrated in FIG. 1. As shown therein, the precut layered metal 20 is partially encased in a plastic support body 14. It is essential that the transducer foil 11 be properly aligned in the plastic support body 14. Parts of the layered metal sandwich designated by reference numerals 26, 17, 17a, 12, and 13 that protrude from the plastic support body 14 permit the use of a fixture or suitable jig to maintain precise foil alignment while the precut metal sandwich 20 is encased by molding or bonding the plastic support structure 14 thereabout. Upon completion of this step, excess part 26 is trimmed and parts 17, 17a, 12 and 13 of the layered metal sandwich can be fixedly secured in a conventional manner to provide precise alignment while the face of the sensor 28 and the exposed edge of transducer foil 11 are ground and polished by conventional methods to a desired smoothness and uniform width for transducer foil 11. A section of the layered metal sandwich 29, FIG. 3, is drilled out to separate the electrodes 13. This metal section 29 provides support until the percut metal sandwich 20 is encased in the plastic support body. The opening 29a caused by the drillng is plugged or otherwise conventionally sealed after removal of a portion of section 29. Excess parts 17 and 17a are trimmed to complete assembly of the sensor depicted in FIG. 1.

Figure 6:
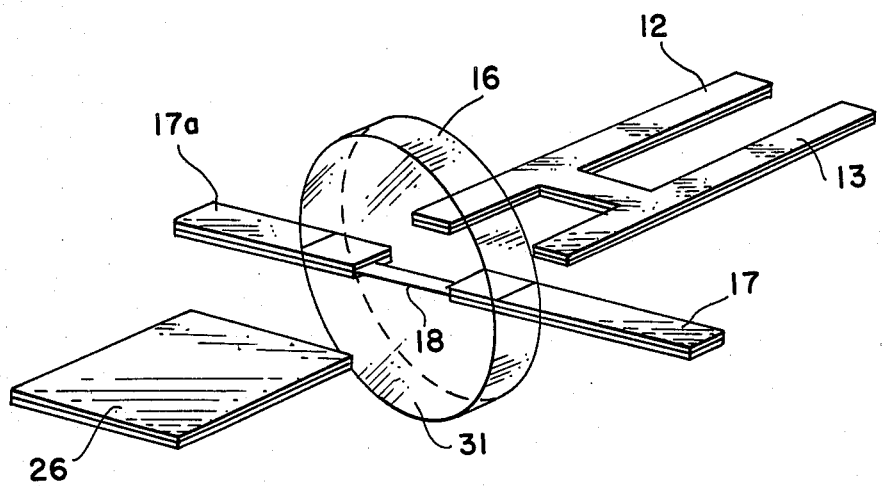
FIG. 6 illustrates the assembly of the embodiment shown in FIG. 2.

Referring now to FIG. 6, there is illustrated the assembly of an alternate embodiment of the sensor 19. By removing the portion of the precut metal sandwich 20 that serves as the electrodes 12 and 13 in sensor 10 and retaining the parts 17 and 17a that aid in alignment, for use as electrodes, a thinner embodiment is assembled.

Calibration is achieved by grinding and polishing the surface 28 and 31 of the respective sensors 10 and 19 by conventional methods to produce a desired width for transducer foils 11 and 18.

Figure 7:
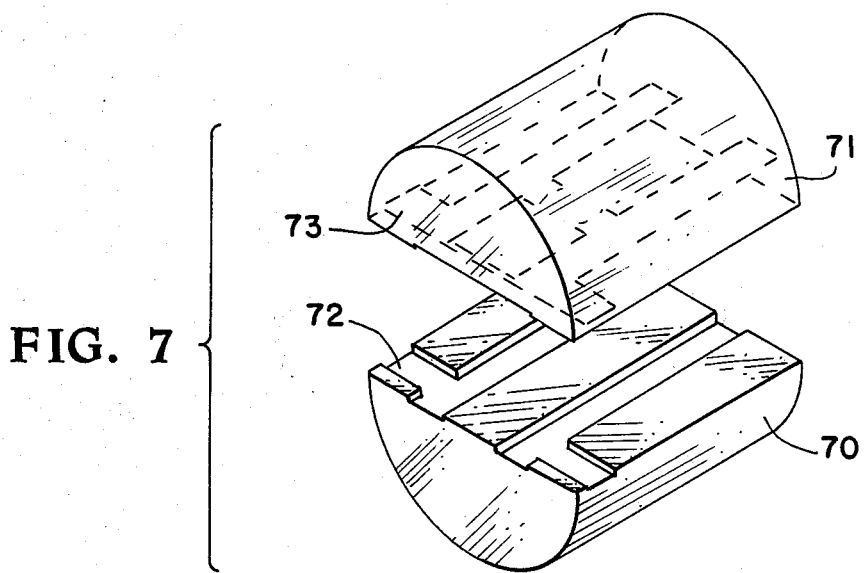
FIG. 7 is a side view of machined half-sections for making the nonconducting plastic support body in constructing the embodiment of FIG. 1.

In one specific example, the precut metal sandwich 20 is comprised of 0.0002 inch platinum foil sandwiched between two metal layers 21 and 22 of 0.005 inch beryllium copper. A thickness range of 0.00013 to 0.0003 for the foil is considered acceptable. Nickel foil of the same thickness range has also been used for the thin foil 23. The plastic support body 14, FIG. 1, in a specific example was Shell crystal polystyrene molded by conventional methods. Dow Chemical's Styron 678U has also been used in the same manner. As illustrated in FIG. 7, other plastic materials, such as for example polysulfone, that cannot be molded by conventional methods may also be used as support bodies 14 and 16 by machining the plastic support bodies into half-segments 70, 71 and using a suitable adhesive or solvent to bond the segments around the metal sandwich transducer elements. For example, Union Carbide's UDEL polysulfone cannot be molded by conventional methods and this material has been machined into halves and solvent bonded around the precut metal sandwich 20 with methylene chloride. In this embodiment, one or both of the machined halves may be further machined as designated by reference numerals 72, 73 so as to provide a cavity therebetween to receive the foil sandwich when the halves are assembled. In some instances, the machined cavities may be omitted and an adequate seal would be provided by the solvent bonding alone.

Although the invention has been described relative to specific embodiments thereof, it is not so limited and numerous variations and modifications will be readily apparent to those skilled in the art in light of the above teachings. It is therefore to be understood that within the scope of the appended claims the invention may be practiced otherwise than as specifically described.

What is claimed as new and desired to be secured by Letters Patent of the United States is:

1. A skin friction sensor comprising:
   a hot transducer for measuring temperature; and
   means for supporting said hot foil transducer including:
   (a) a pair of rigid conductive elements disposed one at each end of said hot foil transducer;
   (b) a nonconductive body encasing all but one edge of said foil transducer; and
   (c) means for connecting said conductive elements to an electrical circuit.

2. A device as in claim 1 wherein said conductive elements are beryllium copper.

3. A device as in claim 1 wherein said nonconductive body is polystyrene molded around said conductive elements.

4. A device as in claim 1 wherein said nonconductive body is polysulphone bonded around said conductive elements.

5. A device as in claim 1 wherein said hot foil transducer is 0.00013 inch to 0.0003 inch thickness platinum foil.

6. A device as in claim 1 wherein said hot foil transducer is 0.00013 inch to 0.0003 inch thickness nickel foil.

7. A method of making a skin friction sensor for measuring air flow friction on a surface comprising the steps of:
   providing a foil transducer for measuring temperature;
   providing electrical conductive elements supporting the foil transducer at opposite ends thereof; and
   encasing the foil transducer and electrical conductive elements in a nonconductive medium so as to leave an edge surface of the foil transducer exposed along one surface of the nonconductive medium and to leave exposed the electrical conductive elements on another surface of the nonconductive medium.

8. The method of claim 7 wherein the nonconductive medium is formed by molding polystyrene around the foil transducer and electrical conductive elements.

9. The method of claim 7 wherein the nonconductive medium is formed by bonding polysulphone half sections around the foil transducer and electrical conductive elements.

10. The method of claim 7 including the further step of polishing the end of the nonconductive medium encasing the foil transducer to a flat surface flush with the exposed edge of the foil transducer.

* * * * *